No. 704,576. Patented July 15, 1902.
J. T. PRIOR.
RAT KILLER.
(Application filed Dec. 10, 1901.)
(No Model.)
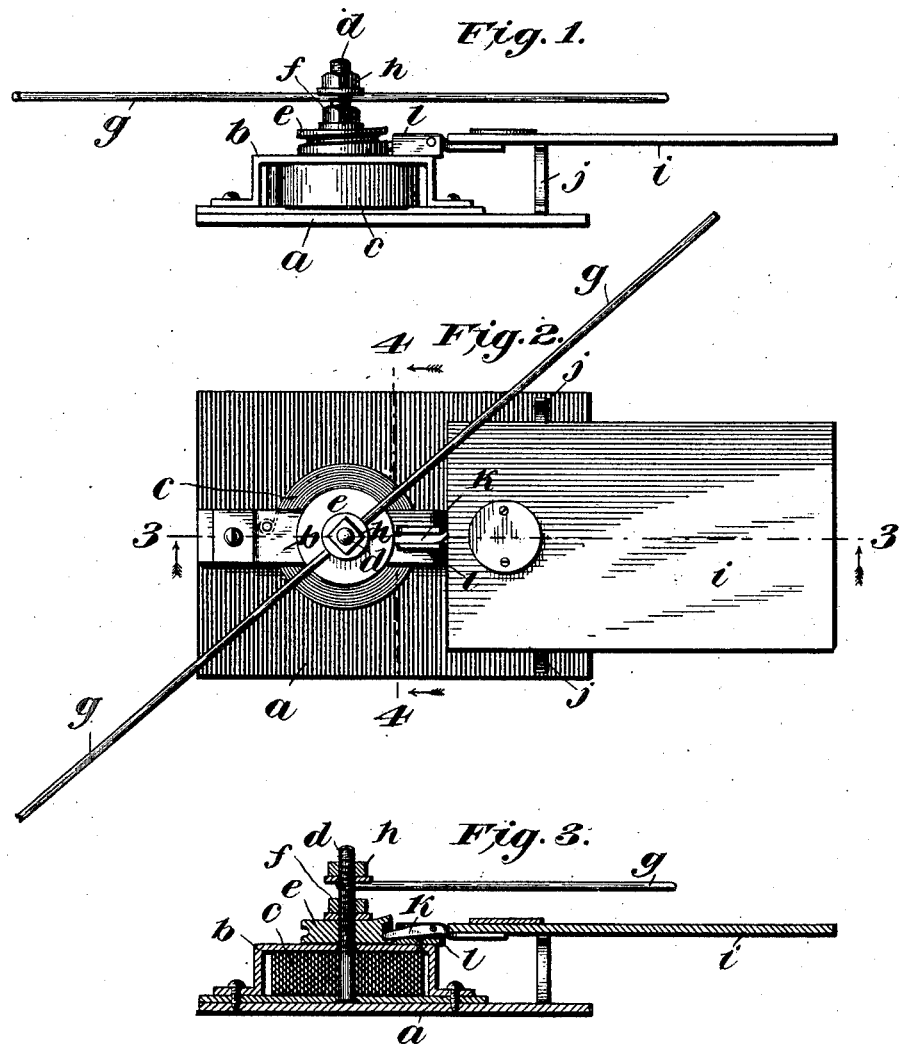
Inventor,
John Thomas Prior,
By Davis & Davis,
Attorneys.
Witnesses
Elmer Seavey

UNITED STATES PATENT OFFICE.

JOHN THOMAS PRIOR, OF PRIORS, GEORGIA.

RAT-KILLER.

SPECIFICATION forming part of Letters Patent No. 704,576, dated July 15, 1902.

Application filed December 10, 1901. Serial No. 85,408. (No model.)

*To all whom it may concern:*

Be it known that I, JOHN THOMAS PRIOR, a citizen of the United States of America, residing at Priors, in the county of Polk and State of Georgia, have invented certain new and useful Improvements in Rat-Killers, of which the following is a specification, reference being had to the accompanying drawings, in which—

Figure 1 represents a side elevation of my apparatus; Fig. 2, a plan view thereof; Fig. 3, a vertical longitudinal section on the line 3 3 of Fig. 2, and Fig. 4 a transverse vertical section on the line 4 4 of Fig. 2.

The object of this invention is to provide a simple apparatus for automatically killing small animals, especially those of the rodent family; and it consists, essentially, of a spring-actuated killing arm or arms, a trigger device for freeing said killing-arms, and a tripping-platform connected to the trigger and adapted to be depressed sufficiently by the weight of the animal to release the trigger, and thereby permit the killing-arms to operate, as more fully hereinafter set forth.

Referring to the drawings by letters, $a$ designates a base-board, on the upper side of which is fastened a frame $b$, which incloses a convolute spring $c$, which at its outer end is attached to the frame and at its end to a central rotatable post $d$, which extends above the frame and has threaded upon it a circular plate or nut $e$, provided in its periphery with a spiral groove and which is locked in position just above frame $b$ by a nut $f$. Secured to the post at a suitable point above nut $f$ is a rod $g$, which lies horizontally and extends to equal distances at diametrically opposite sides of the post, thereby forming two killing-arms. This rod $g$ is preferably attached to the post by passing it through a transverse hole therein and locking it into position by means of a lock-nut $h$, screwed down upon it. Any number of killing-arms may be employed; but I deem two to be sufficient.

The killing-arms are adapted to sweep over a tripping-platform or death-board $i$, which is resiliently supported at one side of the base-board upon a light spring $j$ and is attached at its inner end to the outer end of a trigger $k$, which is pivoted in a channel-iron $l$, secured to one end of the frame $b$ adjacent to the periphery of the disk-nut $e$ and has its inner extremity resting in the spiral groove in said disk-nut and normally engaging a shoulder $m$, formed at one or two points in said groove.

To put the apparatus in readiness for use, it is simply necessary to wind up the spring, which may be done by turning killing-arm backward and place a bait upon the death-board. Then when a rat or other animal in attempting to get the bait puts his weight upon the death-board, and thereby depresses it, the trigger $k$ will be lifted off shoulder $m$ and the spring will instantly and with great force throw the killing arm or arms around and cause them to strike and kill the animal before he has retreated. When the weight of the animal is removed from the board, the board springs upward and the trigger is free to automatically engage shoulder $m$ after it makes one turn, and thereby reset the trap or apparatus automatically. As will be observed, the spiral groove insures the trigger being brought down against shoulder $m$ after each operation, so that the resetting will be a matter of certainty. It will be observed also that more than one of these shoulders or notches may be employed around the spiral groove; but I do not deem it advisable to employ more than two.

It would be obvious that an essential feature lies in the idea of releasing the killing-arms by the weight of the animal, thereby avoiding the necessity of devices which require that the rat shall actually take hold of and pull the bait to trip the killing devices.

Having thus fully described my invention, what I claim, and desire to obtain by Letters Patent, is—

1. In combination, a base, a spring-actuated post rotatably supported thereon and carrying a killing arm or arms and also a circular plate provided with a spiral groove in its periphery, said groove being notched or shouldered at one or more points, a trigger having one end working in said groove and adapted to engage said notch or notches, and a death-board connected to said trigger and lying just under the path of the killing arm or arms, for the purpose set forth.

2. In combination, a base, a frame thereon, a spring-actuated rotatable post, a spirallygrooved nut or plate carried by said post, a killing-arm carried by said post and arranged horizontally, a trigger pivoted on the frame and engaging said spiral groove, and a spring-supported death-board connected to said trigger, for the purpose set forth.

In testimony whereof I hereunto affix my signature, in the presence of two witnesses, this 7th day of December, 1901.

JOHN THOMAS PRIOR.

Witnesses:
J. A. WRIGHT,
HUGHES ROBERTS.